(12) United States Patent
Dheap et al.

(10) Patent No.: US 9,104,480 B2
(45) Date of Patent: Aug. 11, 2015

(54) MONITORING AND MANAGING MEMORY THRESHOLDS FOR APPLICATION REQUEST THREADS

(71) Applicant: International Business Machines Corporation, Armonk, NY (US)

(72) Inventors: Vijay Dheap, Durham, NC (US); Nicholas E. Poore, Durham, NC (US); Lee M. Surprenant, Cary, NC (US); Michael D. Whitley, Weddington, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 235 days.

(21) Appl. No.: 13/677,778

(22) Filed: Nov. 15, 2012

(65) Prior Publication Data

US 2014/0137131 A1     May 15, 2014

(51) Int. Cl.
*G06F 9/50* (2006.01)
*G06F 9/48* (2006.01)
*G06F 11/34* (2006.01)

(52) U.S. Cl.
CPC .. *G06F 9/50* (2013.01); *G06F 9/48* (2013.01); *G06F 9/485* (2013.01); *G06F 9/5005* (2013.01); *G06F 9/5016* (2013.01); *G06F 11/34* (2013.01)

(58) Field of Classification Search
None
See application file for complete search history.

(56) References Cited

U.S. PATENT DOCUMENTS

| | | | | |
|---|---|---|---|---|
| 7,711,822 B1 * | 5/2010 | Duvur et al. | | 709/226 |
| 7,814,491 B1 * | 10/2010 | Chen et al. | | 718/104 |
| 7,895,483 B2 | 2/2011 | Hogstrom et al. | | |
| 7,895,588 B2 | 2/2011 | Rossmann | | |
| 8,090,752 B2 * | 1/2012 | Zedlitz et al. | | 707/814 |
| 8,627,327 B2 * | 1/2014 | Dunshea et al. | | 718/104 |
| 8,813,227 B2 * | 8/2014 | Sallam | | 726/24 |
| 2002/0188734 A1 * | 12/2002 | Johnson | | 709/229 |
| 2003/0135509 A1 * | 7/2003 | Davis et al. | | 707/100 |
| 2007/0169125 A1 * | 7/2007 | Qin | | 718/102 |
| 2007/0174839 A1 * | 7/2007 | Takahashi et al. | | 718/100 |
| 2008/0086734 A1 * | 4/2008 | Jensen et al. | | 718/104 |
| 2008/0313639 A1 * | 12/2008 | Kumar et al. | | 718/104 |
| 2009/0183154 A1 * | 7/2009 | Miskelly et al. | | 718/100 |
| 2009/0235268 A1 * | 9/2009 | Seidman et al. | | 718/104 |
| 2009/0307704 A1 * | 12/2009 | Munshi et al. | | 718/104 |
| 2011/0035554 A1 | 2/2011 | Watson et al. | | |

(Continued)

*Primary Examiner* — Emerson Puente
*Assistant Examiner* — Benjamin Wu
(74) *Attorney, Agent, or Firm* — James L. Baudino

(57) ABSTRACT

A memory management system is implemented at an application server. The management system includes a configuration file including configuration settings for the application server and applications. The configuration settings include multiple memory management rules. The management system also includes a memory management framework configured to manage settings of resources allocated to the applications based on the memory management rules. The applications requests for the resources through one or more independently operable request threads. The management system also includes multiple application programming interfaces (APIs) configured to facilitate communication between the applications and the memory management framework. The management system further includes a monitoring engine configured to monitor an execution of the request threads and perform actions based upon the configuration settings. The actions include notifying the applications about memory related issues and taking at least one preventive action to avoid the memory related issues.

19 Claims, 4 Drawing Sheets

(56) References Cited

U.S. PATENT DOCUMENTS

| | | | |
|---|---|---|---|
| 2011/0161742 A1* | 6/2011 | Bird et al. | 714/47.2 |
| 2011/0231854 A1* | 9/2011 | Augenstein et al. | 718/103 |
| 2012/0166869 A1* | 6/2012 | Young et al. | 714/15 |
| 2013/0080418 A1* | 3/2013 | Kashyap | 707/718 |
| 2013/0332942 A1* | 12/2013 | Ramesh et al. | 719/318 |
| 2014/0115291 A1* | 4/2014 | Caspole | 711/166 |

\* cited by examiner

MONITORING AND MANAGING MEMORY THRESHOLDS FOR APPLICATION REQUEST THREADS

FIELD OF THE INVENTION

The present disclosure relates to computers and more specifically to memory management in computers or other related devices.

BACKGROUND

Memory management is essential when memory is to be allocated to one or more process(es) or software application(s) dynamically on a system such as, but not limited to, a computer. Many programming languages like C, C++ provide many utilities for managing an application's memory usage. However, unlike other programming languages, Java programming language does not expose or provide utilities to manage effectively an application's memory usage. A Java application developer may have to pay special attention to manage system resources for their internal objects or software applications. Likewise, an application server administrator can thoroughly monitor applications, which they deploy to ensure that there are no leaks in the application, which could potentially degrade the server's performance. A new problem area has been exposed by systems, which allow an end-user increasingly granular control over a running application.

For example, consider a mashable application, targeted at line-of-business users, which allows the user to provide a relational query to extract purchase information to use in a dashboard. The user wants to pull all purchases for customer X to display in their dashboard, but neglects or forgets to specify the customer for which to pull the purchases. This may result in the user selecting all data from the purchase table—if the table is sufficiently large, for example 50 million rows, then the user has just created a potential memory leak in the mashable application and potentially crashed the database server.

In light of above discussion and limitations of the existing techniques or solutions for memory management in Java, there exists a need for systems and methods for managing memory in an effective manner.

BRIEF SUMMARY

Embodiments of the present disclosure provide a memory management system implemented at an application server. The memory management system includes a configuration file comprising a number of configuration settings for the application server and a number of applications. The configuration settings include a number of memory management rules. The memory management system also includes a memory management framework, which is configured to manage granular settings of one or more resources allocated to the applications based on the memory management rules. The applications may request for the one or more resources through at least one request thread. The memory management system may also include a number of application programming interfaces (APIs), which are configured to facilitate communication between the applications and the memory management framework. The memory management system also includes a monitoring engine configured to monitor an execution of the at least one request thread and perform one or more actions based on the configuration settings. The one or more actions includes notifying about one or more memory related issues to the applications and taking at least one preventive action to avoid the one or more memory related issues.

An aspect of the present disclosure is to provide a memory management system for monitoring usage of the one or more resources such as memory by the one or more applications.

Another aspect of the present disclosure is to take one or more preventive actions such as interrupting or terminating a problematic request thread or application when a memory related issue arises.

Embodiments of the present disclosure also provide a computer-implemented method for managing memory through an application server on a system. The method includes receiving, by the application server, a query of at least one application from a user of the system. The method also includes executing, by a memory management framework, at least one request thread for the application based on the received query. The method further includes monitoring, by a monitoring engine, the execution of the at least one request thread. The monitoring includes determining whether the number of one or more resources allocated to the at least request thread is exceeding a system threshold value for the application. The monitoring further includes sending at least one notification to the at least one request thread to interrupt or terminate it based on a memory related issue.

Embodiments of the also provide a computer program product embodied on a computer readable medium having instructions for managing memory through an application server on a system. The computer program product may perform the steps of receiving, by the application server, a query of at least one application from a user of the system. The computer program product may further include instructions for executing, by a memory management framework, at least one request thread for the application based on the received query. The computer program product may include instructions for monitoring, by a monitoring engine, the execution of the at least one request thread. The monitoring includes determining whether the number of one or more resources allocated to the at least one request thread is exceeding a system threshold value for the application. The monitoring step further includes sending a notification to the request thread to interrupt or terminate it based on a memory related issue.

DETAILED DESCRIPTION

Figure 1:
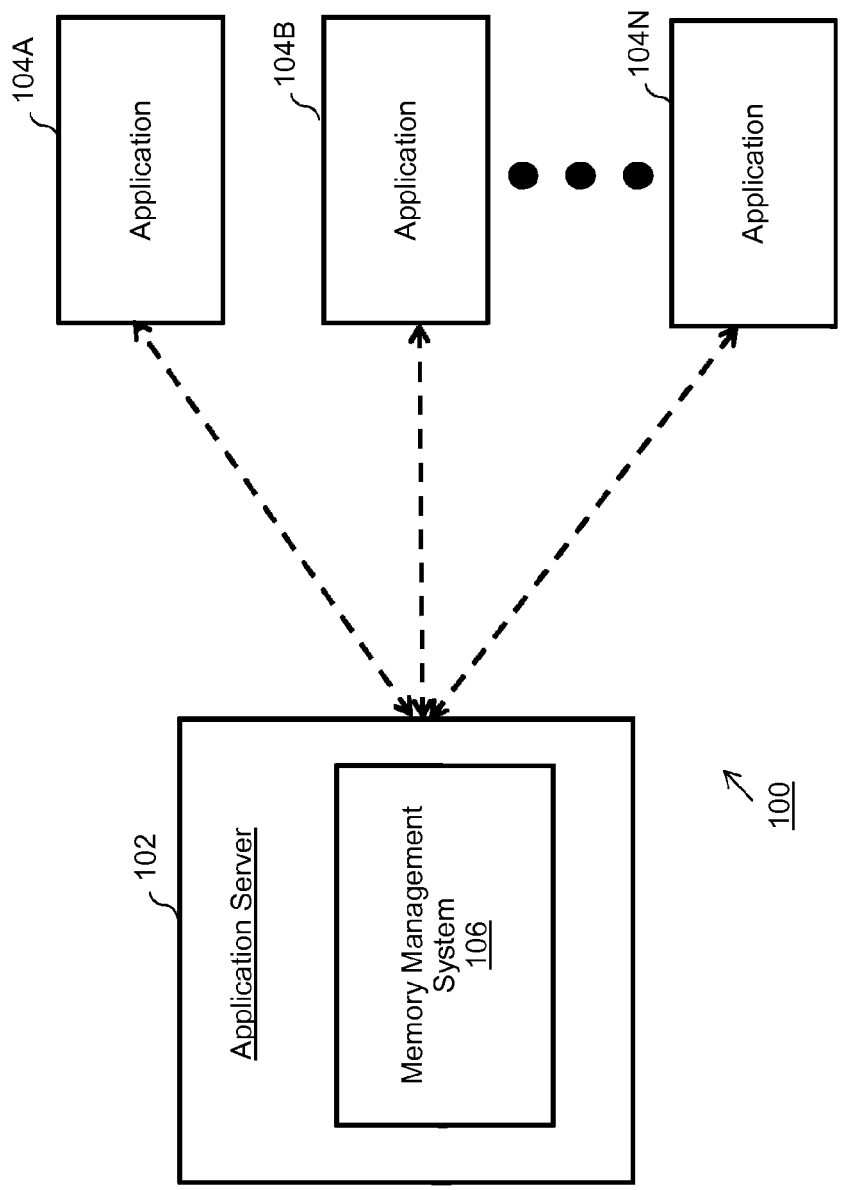
FIG. 1 illustrates an exemplary environment where various embodiments of the present disclosure may function.

Illustrative embodiments of the invention are described below with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired, optical fiber cable, RF cable, etc., or any suitable combination of the foregoing.

Computer program code for carrying out operations for aspects of the present invention may be written in object-oriented programming language such as Java programming language. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Prior to discussing the figures, it is important to note that there are two solutions available to the application developer in Java environment or language. The first conventional solution is through the Java Database Connectivity (JDBC) specification, which provides access to a database, and also provides application-programming interfaces (APIs) to limit the size of a query. The problem is that only very few JDBC drivers implement this. For example, Derby and DB2 drivers do not implement it and do not provide any failsafe method for executing queries in Java applications.

The second conventional solution is based on Java system utilities that may allow the user to monitor memory and catch OutOfMemoryError (OOME). These utilities fail to prevent the outcome from the above example because the Java Memory Management Bean only allows for monitoring of the entire Java heap, not just for an individual application, or a single request in an application. Therefore, there is no real granular control on the memory usage by the application. Further, catching an OutOfMemoryError through Java utilities is usually too late. When an OOME is thrown, the system has already generated a core dump, and which is generally not recoverable. The application developer can try to catch these errors, but cannot effectively do anything to recover. In addition, a direct call to Java's garbage collector to run does not guarantee that it will run and there is no way to force an immediate cleanup of memory.

Prior to a discussion of the figures, the present disclosure pertains to a memory management framework for an application server that allows for management of resources that reside on application server. Details of the memory management features are best described in connection with the following figures.

With reference now to the figures and in particular with reference to FIG. 1, an exemplary diagram of data processing environment is provided in which illustrative embodiments may be implemented. It should be appreciated that FIG. 1 is only exemplary and is not intended to assert or imply any limitation with regard to the environment in which different embodiments may be implemented. Many modifications to the depicted environment may be made.

FIG. 1 depicts an exemplary environment 100 where various embodiments of the present disclosure may function. The environment 100 may include an application server 102, or any system with a software-based service that handles request responses. The application server 102 may include a runtime configurable framework i.e. a memory management system 106 that is configured to manage memory allocation and de-allocation for various applications 104A-N. In an embodiment, the application server 102 and the applications 104A-N are part of a system. The application server may receive a query related to at least one of the applications 104A-N from a user of the system. The system can be such as, but not limited to, a computer, a laptop, a tablet computer, a cell phone, and so forth. The applications 104A-N can be software applications, and typically Java applications. The application server 102 may execute at least one request thread for the at least one of the applications 104A-N based on the received query. The received query could be a request from a browser for www.ibm.com. The user makes this request and the web server/application server at ibm.com handles it. The request is routed to an available request thread where a response is constructed. The response is sent back to the user's browser and, once the response is sent, the web server/application server will recycle the request thread and add it back to the thread pool to process subsequent requests.

The memory management system 106 is a runtime configurable framework that may be implemented at the application server 102. The memory management system 106 is configured to provide runtime configuration for the application server 102 and the one or more applications 104A-N to define a granular level of resource usage allotment. By defining a granular level of resource usage, it is possible to control from a macro point of view, i.e. from the entire server, as opposed to controlling from a micro point of view such as at the individual application level.

In an embodiment, the resource can be memory or other objects, which are required for execution of the request threads or the applications 104A-N. The memory management system 106 is also configured to monitor the execution of the at least one request thread associated with the applications 104A-N. The memory management system 106 may determine whether the number of one or more resources allocated to the request thread is exceeding a system threshold value for the application or not. The memory management system 106 is also configured to send at least one notification to the at least one request thread to interrupt or terminate the request thread based on a memory related issue or the received notification. The memory management system 106 is further configured to monitor stabilization in the consumption of the one or more resources in case the request thread has been terminated or stopped. Stabilization occurs when there is a return to normal usage from a larger, or peak, resource usage. The memory management system 106 is further configured to determine and compare usage of the individual request threads to current overall usage of the system. The memory management system 106 is also configured to notify individual request threads and the associated application of the applications 104A-N, that the current request has exceeded the allotment of the available resources and need to be terminated.

The memory management system may monitor the execution of the applications 104A-N and identify one or more applications 104A-N that should be terminated to avoid any memory related issue. The memory related issue can be such as, a memory leak, memory crash, and so forth. The memory management system 106 may monitor based on one or more predefined memory management rules for the application server 102 and the applications 104A-N. The memory management system 106 is configured to terminate any runaway or problematic request threads (or zombie threads), which may not respond to the notifications sent by the memory management system 106. The memory management system 106 is further configured to trigger a garbage collection to perform clean up operation for the interrupted or terminated request thread. The memory management system 106 is also configured to notify the application associated with the terminated request thread or applications 104A-N. In an embodiment, the garbage collection may be performed through a Java garbage collection module. The memory management system 106 may be deployed on the system such as the computer or a server in the network. The structural components of the memory management system 106 are described in detail in FIG. 2.

Figure 2:
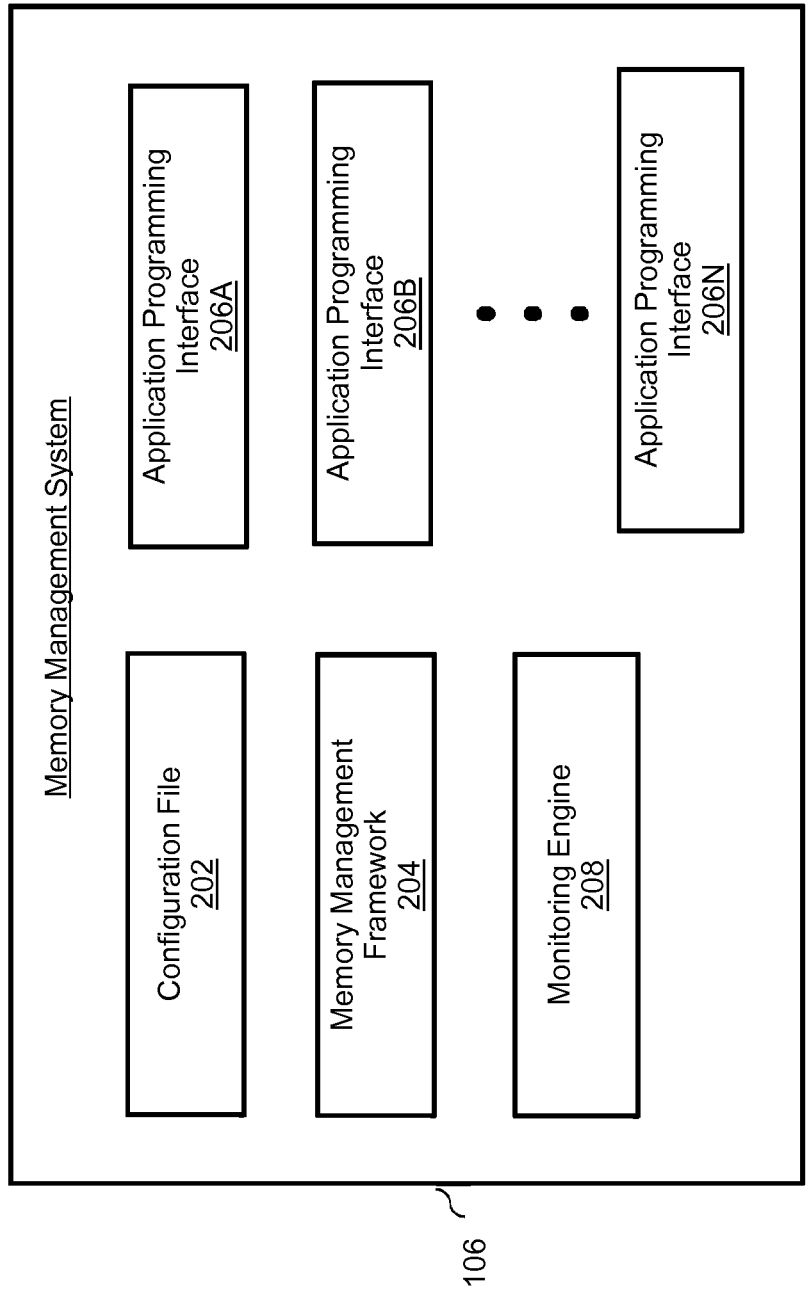
FIG. 2 illustrates exemplary structural components of a memory management system, in accordance with an embodiment of the present disclosure.

FIG. 2 illustrates exemplary structural components of the memory management system 106, in accordance with an embodiment of the present disclosure. As shown, the memory management system 106 may include a configuration file 202, a memory management framework 204, a number of application programming interfaces (APIs) 206A-N, and a monitoring engine 208. As discussed with reference to FIG. 1, the configuration file 202 is configured to define one or more configuration settings for the application server 102 and the applications 104A-N. In an embodiment, the configuration settings are defined with assistance from an application server administrator or application developers. The configuration settings may include a number of memory management rules for the application server 102 and for each of the applications 104A-N. The memory management rules for the application server 102 may include a first memory threshold value and a first resource threshold value.

The first memory threshold value may define an upper limit of memory for the application server before which the memory management framework 204 should attempt at least one of a recovery or a deployment of one or more applications of the applications 104A-N on another application server (not shown). The deployment of one or more applications could be used when there are large request loads and it is desirable to service the requests. Using commercially available, automated deployment scripts/methodologies, and once a preselected resource threshold is met, a deployment of the same application is made to another application server. By making this deployment, new in-coming requests are spread across two application servers instead of one, thus lowering the resource usage on the individual application server. The first resource threshold value may define an upper limit of number of system resources for each of the applications 104A-N. In an embodiment, the application server administrator may define the configuration settings for the application server 102.

Similarly, the memory management rules for each of the applications 104A-N may include a second memory threshold value and a second resource threshold value. The second memory threshold value may define an upper limit of memory for the each of the applications 104A-N before the memory management framework 204 should attempt at least one of a recovery or a deployment of one or more applications of the applications 104A-N on the another application server (not shown). The second resource threshold value may define an upper limit of number of system resources for an individual request thread associated with each of the applications 104A-N. The memory management rules for each of the applications 104A-N also includes one or more profiling options to allow the memory management framework 204 to optimize the number of system resources for a particular resource to be allocated to the at least one request thread associated with each of the applications 104A-N. Optimization is achievable because resource values such as maximum memory threshold are suggestions to the system. Using these suggestions, the memory management framework 204 then finds a balanced configuration that optimizes the available resources. In an embodiment, a number of application developers may define the configuration settings for each of the applications 104A-N.

The memory management framework 204 may be configured to manage granular settings of one or more resources allocated to the applications 104A-N based on the multiple memory management rules. The applications 104A-N may request the one or more resources through at least one request thread associated with each of the applications 104A-N. The memory management framework 204 is further configured to manage the granular settings based on the memory management rules and applies the memory management rules at the application server 102. The memory management framework 204 is also configured to calculate available memory of the system and also the memory allocated to each of the applications 104A-N. The memory management framework 204 may calculate memory by requesting the at least one request thread to determine its own size depending on the implementation of the memory management framework 204. The memory management framework 204 may also calculate memory by attempting a recursive calculation of one or more objects or resources held by the request thread(s) associated with each of the applications 104A-N. In an embodiment, the memory calculation may be extended when Java extends memory management capabilities.

The multiple APIs 206A-N may facilitate communication with the memory management framework 204. Examples of the APIs 206A-N may include, but are not limited to, a warning API, a terminate API, a size-request or getObjectSize API, and so forth. The warning API may be called by the memory management framework 204 to tell or notify one or more of the applications 104A-N that they may need to begin saving current state and may need to shut down. The application is aware of the warning API and coded to react to it if it is to take advantage of the warning system. If the application is not aware of the warning API, then the system will take the additional steps of terminating the thread. The terminate API may be called by the memory management framework 204 to notify the one or more of the applications 104A-N that they are about to be killed or terminated. The getObjectSize API may be called by the memory management framework 204 to request a size of one or more objects associated with each of the applications 104A-N.

The monitoring engine 208 may be configured to monitor an execution of the at least one request thread associated with each of the applications 104A-N. The monitoring engine 208 is also configured to perform one or more actions based on the configurations settings. The one or more actions may include notifying about one or more memory related issues to the associated applications 104A-N, and taking at least one preventive action to avoid the one or more memory related issues. The monitoring engine 208 may use or consume the configuration settings related information and may apply one or more memory management rules through the memory management framework 204 and the APIs 206A-N for monitoring and managing the system. Depending on whether the applications 104A-N has implemented one or more APIs from the APIs 206A-N, the monitoring engine 208 may communicate or notify the one or more of the applications 104A-N about at least one memory related issue (if any). The monitoring engine 208 may also take at least one preventive action without notifying the applications 104A-N. Examples of the preventive action may include, but are not limited to, attempts to free memory via a garbage collection option, use of pluggable third party tools for memory management, and request thread interruption or destruction (or termination). The monitoring engine 208 is further configured to notify application administrators associated with the applications 104A-N depending on the severity of the at least one memory related issue of the applications 104A-N or an individual application. The monitoring engine 208 is also configured to perform at least one of an interrupt or terminate operation on at least one of the applications 104-N based on the notification.

Figure 3A:
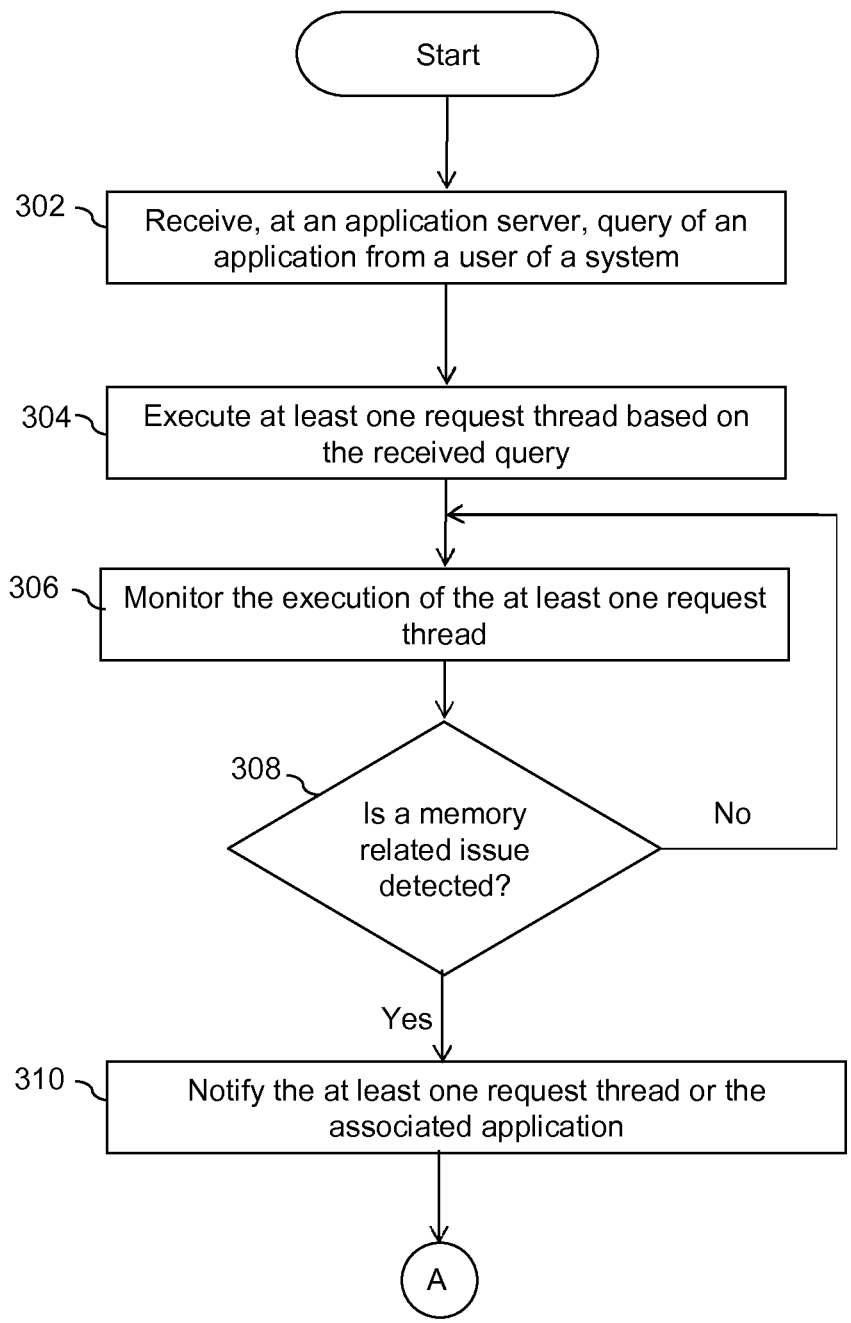
FIGS. 3A and 3B are flowchart diagrams illustrating a method for managing memory on a system, in accordance with an embodiment of the present disclosure.
Figure 3B:
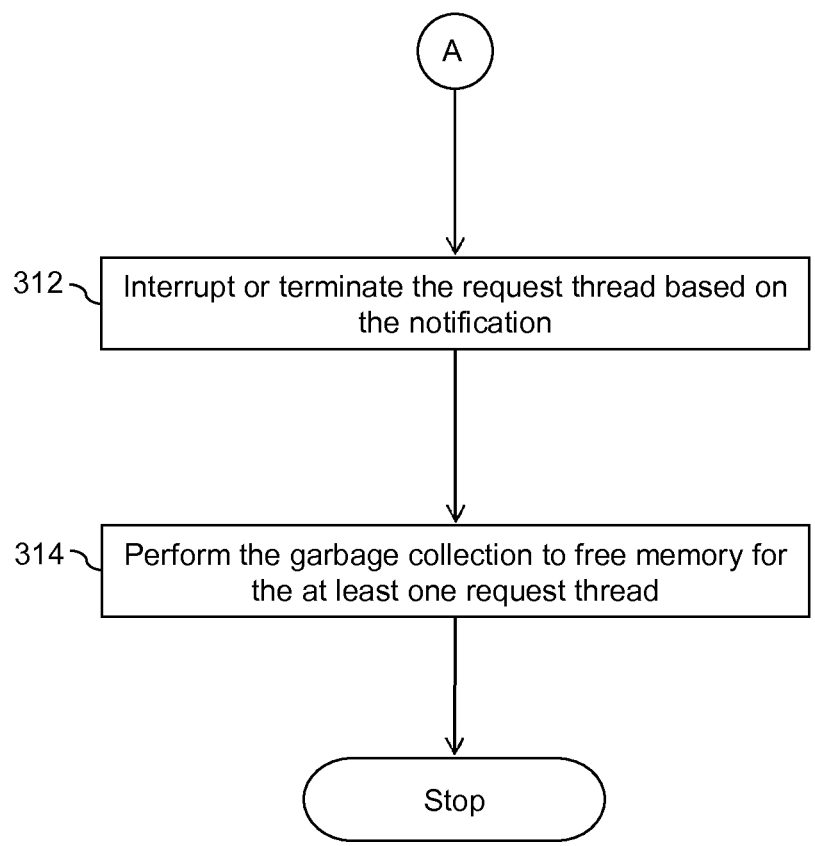

FIGS. 3A and 3B are flowchart diagrams illustrating a method for managing memory (or resource) on a system, in accordance with an embodiment of the present disclosure. As discussed with reference to FIGS. 1 and 2, the applications 104A-N may request memory through at least one request thread(s). The application server 102 is configured to monitor execution of the request thread(s). The memory management system 106 includes the configuration file 202, the memory management framework 204, the APIs 206A-N, and the monitoring module 208. The memory management system 106 is configured to manage memory for the applications 104A-N.

At step 302, a query of an application of the application 104A-N may be received at the application server 102 from a user of the system. In an embodiment, the applications 104A-N may be Java applications. At step 304, at least one request thread may be executed based on the received query. At step 306, the monitoring engine 208 may monitor the execution of the at least one request thread. At step 308, it is checked whether a memory related issue is detected. Examples of the memory related issue may include, but not limited to, a memory leak, a memory crash, and so forth. At step 308, if the memory related issue is detected then step 310 is followed else control goes back to step 308. At step 310, the monitoring engine 208 may notify the at least one request thread or its associated application(s) about the memory related issue. Then at step 312, the monitoring engine 208 may either interrupt or terminate the execution of the request thread or its associated application depending on the notification or the severity of the memory related issue. [why would the request thread be terminated if the related application is having problems, but the related application itself would not be?] Monitoring engine 208 is assuming that the resource utilization problems can be tracked to a thread. By dealing with a problem thread, the resource problem is solved.

Thereafter, at step 314, garbage collection is performed to free memory for the problematic request thread. Request threads operate independently and are usable to service requests and create responses in an application server. For example, if there are 100 request threads, then each of those threads can be serviced concurrently. In an embodiment, the garbage collection may be performed using a Java garbage collection module.

Further, the memory management system 106 can be implemented as hardware, software, firmware, or combination of these. The memory management system 106 may be deployed on the system such as, a computer, a laptop, a server, and so forth. In an exemplary scenario, after deployment the application server administrator may define in the system configuration that no application can exceed 80% of total system usage. Similarly, on deployment of the memory management system 106 on the system, the application developer may define in an application configuration that no request thread of the application can exceed 50% of total application resource usage. The resource may be memory or other objects associated with the system (e.g. computer). When the application server 102 starts up, the memory management framework 204 may start monitoring memory usage of the new request threads in relation to the system usage or performance. When a user defines a query in the application to select all rows from a purchase table, the request thread is executed based on the query. The monitoring engine 208 continuously monitors the execution of the at least one request thread. During the execution of the request thread, the monitoring engine 208 may detect that the request thread has begun to increase consumption of the system resources (e.g. memory).

As the request thread continues it's execution, the monitoring engine 208 determines that the resource usage of the request thread has become critically close to the defined limits i.e. system threshold value(s) or resource threshold value(s) and may send a notification to the request thread to halt processing if possible. If after receiving the notification, the application associated with or servicing the problematic request thread can terminate and clean up the action, then the monitoring engine 208 will be able to monitor stabilization in the resource consumption. Thereafter, the monitoring engine 208 may attempt to trigger garbage collection such as Java garbage collection to try and cleanup as necessary. If after receiving the notification, the application servicing the problematic request thread either does not or cannot stop or clean up the action, then the monitoring engine 208 may attempt to sacrifice this request thread and interrupt or terminate the request thread based on the severity of the memory related issue. Thereafter, the monitoring engine 208 may attempt to invoke the garbage collection such as the Java garbage collection. As a result, the monitoring engine 208 may notify the specified system including the application associated with the problematic request thread.

Embodiments of the invention provide a runtime configurable memory management system 106 for managing memory for runtime configurable applications 104A-N, typically Java applications. The disclosed memory management system 106 also provides granular level control of the applications 104A-N.

Embodiments of the invention are described above with reference to block diagrams and schematic illustrations of methods and systems according to embodiments of the invention. It will be understood that each block of the diagrams and combinations of blocks in the diagrams can be implemented by computer program instructions. These computer program instructions may be loaded onto one or more general-purpose computers, special purpose computers, or other programmable data processing translator to produce machines, such that the instructions, which execute on the computers or other programmable data processing translator create means for implementing the functions specified in the block or blocks. Such computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the various embodiments of the present invention has been presented for purposes of illustration, but is not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A memory management system implemented at an application server comprising:
    a processor;
    a configuration file accessible by the processor and comprising a plurality of configuration settings for the application server and a plurality of applications, the configuration settings comprising a plurality of memory management rules;
    a memory management framework configured to manage settings of one or more resources allocated to the plurality of applications based on the plurality of memory management rules, wherein the plurality of applications request the one or more resources through at least one request thread;
    a plurality of application programming interfaces (APIs) configured to facilitate communication between the plurality of applications and the memory management framework; and
    a monitoring engine configured to:
        monitor an execution of the at least one request thread; and
        perform one or more actions based on the plurality of configuration settings, wherein the one or more actions comprises:
        notifying about one or more memory issues related to the plurality of applications; and
        taking at least one preventive action to avoid the one or more memory issues; and
    wherein the memory management framework is further configured to calculate memory by performing at least one of:
        asking the at least one request thread to determine its own size; and
        performing a recursive calculation of the one or more resources held within the at least one request thread.

2. The memory management system of claim 1, wherein the memory management rules for memory configuration of the application server comprise:
    a first memory threshold value defining an upper limit of memory for the application server before the memory management framework should attempt at least one of a recovery and a deployment of one or more applications of the plurality of applications on another application server; and a first resource threshold value defining an upper limit of number of system resources for the application.

3. The memory management system of claim 2, wherein memory management rules for configuration of each of the plurality of applications comprises:
   a second memory threshold value defining an upper limit of memory for each of the applications before the memory management framework should attempt at least one of a recovery and a deployment of the application on the another application server;
   a second resource threshold value defining an upper limit of number of system resources for an individual request thread associated with each of the applications; and
   one or more profiling options to allow the memory management framework to optimize the number of system resources for a particular resource to be allocated to the at least one request thread.

4. The memory management system of claim 1, wherein the plurality of APIs comprises at least one of, but not limited to:
   a warning API configured to notify each application to save a current state and to shut down;
   a terminate application configured to notify each application when the application is about to be terminated; and
   a size-request API configured to request a size of the at least one request thread and an application object.

5. The memory management system of claim 1, wherein the at least one preventive action comprises one or more thread notifications, an attempt to free memory through garbage collection, interruption of the at least one request thread, and termination of the at least one request thread.

6. The memory management system of claim 5, wherein the garbage collection is performed through a Java garbage collection module.

7. The memory management system of claim 1, wherein the monitoring engine is further configured to:
   apply the plurality of memory management rules for monitoring the plurality of applications and associated request threads through the memory management framework and the plurality of APIs;
   notify a plurality of application administrators associated with the plurality of applications depending on severity of a memory related issue of the applications; and
   perform at least one of an interrupt or terminate operation on at least one application of the plurality of applications based on the notification.

8. The memory management system of claim 1, wherein an application server administrator defines the plurality of configuration settings for the application server.

9. The memory management system of claim 1, wherein a plurality of application developers defines the plurality of configuration settings for each of the plurality of applications.

10. The memory management system of claim 1, wherein the plurality of applications are the Java applications.

11. A computer-implemented method for managing memory through an application server on a system, the method comprising:
    receiving, by the application server, a query of at least one application from a user of the system;
    executing, by a memory management framework, at least one request thread for the at least one application based on the received query;
    monitoring, by a monitoring engine, the execution of the at least one request thread, wherein the monitoring comprises:
        determining whether one or more resources allocated to the at least one request thread is exceeding a system threshold value for the at least one application; and
        sending at least one notification to the at least one request thread to interrupt or terminate the at least one request thread based on a memory related issue; and
    calculating, by the memory management framework, memory by at least one of:
        asking the at least one request thread to determine its own size; and
        performing a recursive calculation of the one or more resources held within the at least one request thread.

12. The computer-implemented method of claim 11, wherein the one or more resources comprises the memory.

13. The computer-implemented method of claim 11 further comprising:
    interrupting the execution of the at least one request thread based on the notification received from the monitoring engine;
    monitoring a stabilization in the consumption of the one or more resources; and
    triggering garbage collection to perform clean up operation for the interrupted at least one request thread.

14. The computer-implemented method of claim 13 further comprising:
    terminating the execution of the at least one request thread based on the notification received from the monitoring engine;
    triggering garbage collection to perform the clean up operation for the terminated at least one request thread; and
    notifying the application associated with the terminated at least one request thread.

15. The computer-implemented method of claim 13 or claim 14, wherein the garbage collection is performed through a Java garbage collection module.

16. The computer-implemented method of claim 11, wherein the plurality of applications are Java applications.

17. A computer program product embodied on a non-transitory computer readable medium having instructions for managing memory through an application server on a system, the computer program product performing the steps of:
    receiving, by the application server, a query of at least one application from a user of the system;
    executing, by a memory management framework, at least one request thread for the at least one application based on the received query; and
    monitoring, by a monitoring engine, the execution of the at least one request thread, wherein monitoring comprises:
        determining whether one or more resources allocated to the at least one request thread exceeding a system threshold value for the at least one application; and
        sending a notification to the at least one request thread to pause or terminate the at least one request thread based on a memory related issue; and
    calculating, by the memory management framework, memory by at least one of:
        asking the at least one request thread to determine its own size; and
        performing a recursive calculation of the one or more resources held within the at least one request thread.

18. The computer program product of claim 17 further comprising instructions for:
    interrupting the execution of the at least one request thread based on the notification received from the monitoring engine;

monitoring a stabilization in the consumption of the one or more resources; and triggering garbage collection to perform clean up operation for the at least one interrupted request thread.

19. The computer program product of claim 18 further comprising instructions for:

terminating the execution of the at least one request thread based on the notification received from the monitoring engine;

triggering garbage collection to perform the clean up operation for the terminated at least one request thread; and notifying the application associated with the terminated at least one request thread.

* * * * *